United States Patent [19]

Amr

[11] Patent Number: 4,961,847
[45] Date of Patent: * Oct. 9, 1990

[54] SUCTION STRAINER

[75] Inventor: Yehia M. Amr, Manlius, N.Y.

[73] Assignee: Carrier Corporation, Syracuse, N.Y.

[*] Notice: The portion of the term of this patent subsequent to Aug. 7, 2007 has been disclaimed.

[21] Appl. No.: 306,016

[22] Filed: Feb. 2, 1989

[51] Int. Cl.$^5$ .............................................. B01D 35/02
[52] U.S. Cl. .................................. 210/137; 55/503; 55/521; 210/452; 210/497.01
[58] Field of Search ................ 55/201, 203, 204, 503, 55/521; 210/304, 420, 451, 452, 454, 456, 457, 498, 499, 416.1, 137, 453, 497.01, 497.3; 418/47

[56] References Cited

U.S. PATENT DOCUMENTS

| | | | |
|---|---|---|---|
| 1,967,785 | 7/1934 | Schacht | 210/451 |
| 2,023,423 | 12/1935 | Kleckner | 210/452 |
| 2,366,579 | 1/1945 | Von Ahrens | 285/111 |
| 2,583,522 | 1/1952 | Winslow et al. | 210/1.5 |
| 2,657,805 | 11/1953 | Palcer | 210/164 |
| 2,739,828 | 3/1956 | Schindler et al. | 285/90 |
| 2,893,563 | 7/1959 | Bottum | 210/452 |
| 3,458,050 | 7/1969 | Cooper | 210/452 |
| 3,667,616 | 6/1972 | Wayne | 210/451 |
| 3,970,566 | 7/1976 | Rosaen | 210/452 |
| 4,197,207 | 4/1980 | Rosaen et al. | 210/447 |
| 4,560,329 | 12/1985 | Hiramara et al. | 418/47 |
| 4,678,589 | 7/1987 | Ayres, Jr. | 210/499 |
| 4,818,402 | 4/1989 | Steiner et al. | 210/452 |

OTHER PUBLICATIONS

Bulletin 85, Ametek.
Heating/Piping/Air Conditioning, Aug. 1988, p. 89.
Multicylinder type "K", Compressors, Crepaco.
High IQ Helical Screw Compressor
Reco
Frick Equipment Manual-Section 70, E70-115SED-/Apr. 87.
York Model is Screw Compressor Unit.
Frick RWBII Screw Compressor with Microprocessor Control.
FES Dual Screw Packages with Micro II Control.
FES Technical Manual Rotary Screw Compressors Primary Examiner—Richard V. Fisher
Assistant Examiner—Joseph Drodge
Attorney, Agent, or Firm—David J. Zobkiw

[57] ABSTRACT

A suction strainer for use with a fluid machine in the form of a tee-shaped housing with a crossover bore, an upright branch, a seal and a frustoconical mesh strainer is provided in which the mesh portion is spaced from the outlet of the housing so as to provide a large area of the mesh portion with the same pressure drop. Additionally, the entrance to the outlet branch is provided with a generous radius for a smoother flow transition.

7 Claims, 3 Drawing Sheets

SUCTION STRAINER

BACKGROUND OF THE INVENTION

A compressor can be protected from particulate matter and debris by locating a suction strainer upstream of the inlet of the compressor Ordinarily, the basket of the strainer is corrugated to increase the surface area exposed to the flow and the flow is directed into the basket of the strainer such that the flow changes direction in passing through the screen or the like defining the basket. Ideally, the entire surface of the basket defines the flow path. In a typical configuration, a generally cylindrical strainer is located in the crossarm of a tee which is closed at one end. As a result, the flow axially entering the strainer from the crossarm passes radially through the strainer and into the upright branch of the tee from which it enters the compressor. The "shortest distance" flow path would have the flow passing through the strainer in the region closest to the upright branch and over an area roughly corresponding to the area of the entrance to the upright branch The efficient operation of the strainer requires the use of as much of the surface area as possible so a portion of the flow is required to take a longer flow path. Normally the strainer is spaced from the surrounding tee for most of its area. Unfortunately, it has been found that high fluid velocity gradients in the gap between the strainer and the adjacent wall, induces differential pressure distribution in the region between the strainer and the adjacent wall region and tends to draw the fluid to the outlet so that the strainer and tee coact in the region of the outlet to restrict and/or block flow between the space defined between the strainer and the wall of the surrounding tee and the outlet. This is further exacerbated a sharp transition between the crossarm and the upright branch which reduces the entrance area of the outlet.

SUMMARY OF THE INVENTION

A suction strainer is located in the crossarm portion of a tee and is held in a spaced relationship with the inner wall of the crossarm. This results in a generally uniform annular clearance between the basket of the suction strainer and the inner wall of the crossarm. Preferably, the strainer basket converges in a downstream direction at an angle of approximately 5° which further increases the annular clearance. The entrance to the upright branch is provided with a generous radius which provides both a large entrance flow area and a smoother flow transition.

It is an object of this invention to provide a suction strainer with reduced discharge losses.

It is another object of this invention to provide a suction strainer having a more uniform flow.

It is an additional object of this invention to minimize the differences in flow path resistance for flow paths through most of all of the strainer.

It is a further object of this invention to provide a suction strainer capable of trapping particulate matter and debris while providing a minimal pressure loss. These objects, and others as will become apparent hereinafter, are accomplished by the present invention.

Basically, a strainer is located in the crossarm of a tee with one end of the crossarm defining an inlet and the other end being closed. An inlet ring is located in the inlet end of the crossarm and coacts with the strainer basket to properly position the strainer with respect to the upright branch which defines the outlet while directing the flow into the interior of the strainer basket. The strainer is sized to have an external surface area 6-10 times the exit pipe area. The strainer is located in spaced relationship with the crossarm such that there exists a gap of 0.15 to 0.25 times the exit pipe diameter. The well rounded entrance to the upright branch defining the exit has a rounding radius of at least 0.1 times the exit pipe diameter, preferably 0.2 times. Because the strainer is located in a spaced relationship with the surrounding crossarm, the entire available area of the strainer basket can be used as the flow path. As a result, the flow through the strainer basket has a very low pressure loss. The flow passing through the strainer basket into the surrounding annular space flows into the upright branch via a well rounded exit. In the preferred embodiment, the strainer basket converges in a downstream direction which causes the annular space to diverge in the downstream direction and to space the strainer basket a greater distance from the well rounded entrance to the upright branch.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
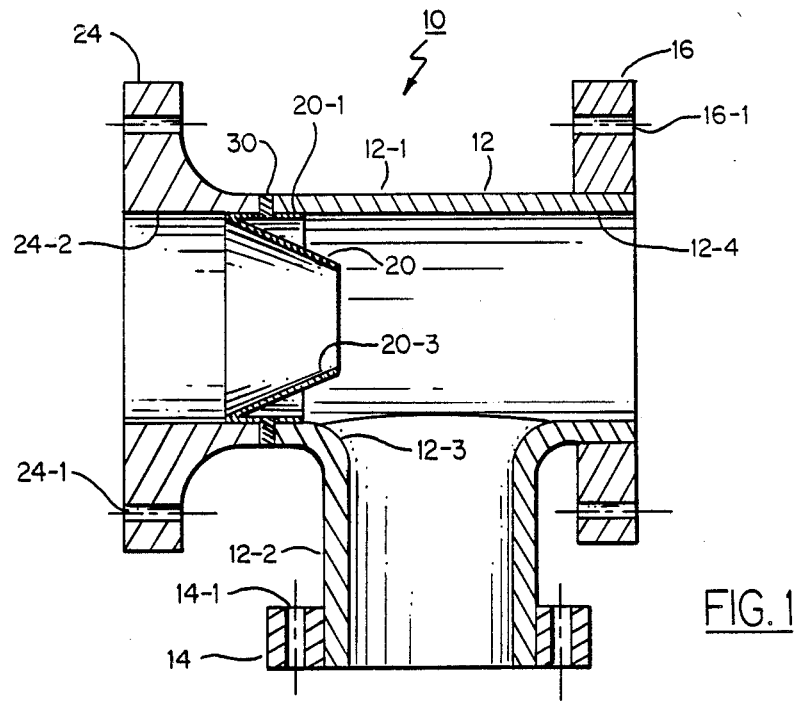
FIG. 1 is a sectional view of the housing for the suction strainer.
Figure 2:
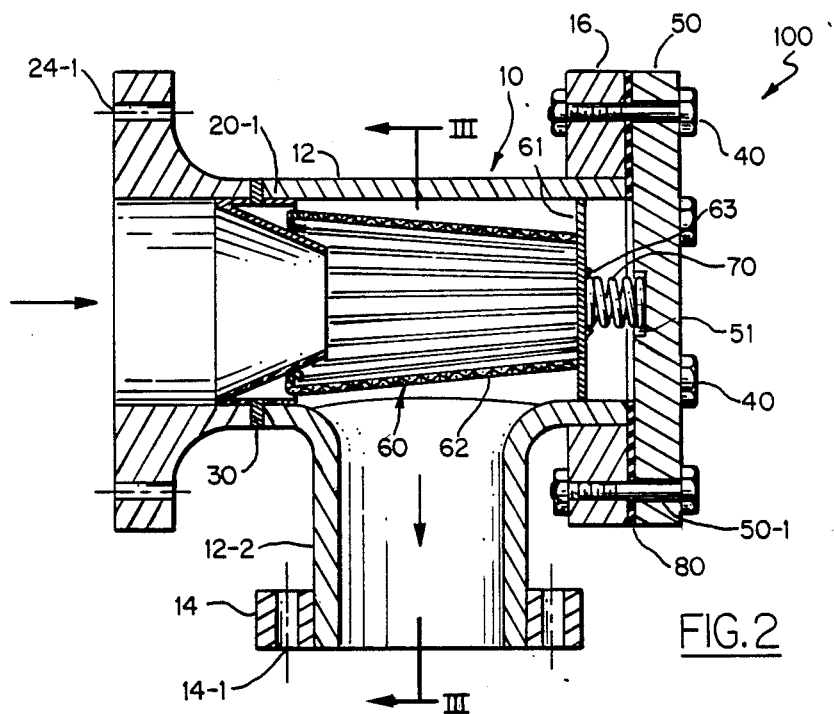
FIG. 2 is a sectional view corresponding to FIG. 1 and showing the assembled suction strainer assembly.
Figure 3:
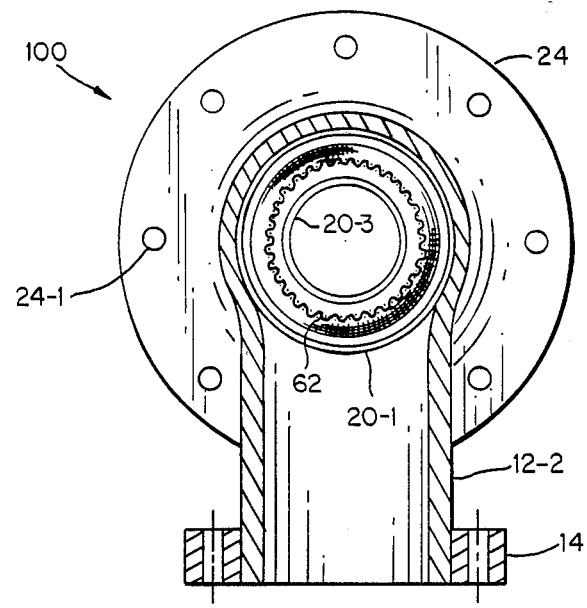
FIG. 3 is a sectional view taken along line III—III of FIG. 2.

In FIGS. 1-4, the numeral 10 generally designates the housing of suction strainer assembly and the numeral 100 indicates the assembled suction strainer assembly. Suction strainer assembly housing 10 includes a tee 12 defining a seamless weld fitting and having a crossarm 12-1 and an upright branch 12-2 connected through a well rounded section 12-3 defining the entrance to the upright branch 12-2 from crossarm 12-1. Blind flanges 14 and 16 are welded to the end of upright branch 12-2 and one end of crossarm 12-1, respectively. The numeral 20 generally designates an inlet ring which also functions as a welding ring. Inlet ring 20 has an outer, cylindrical portion 20-1 sized to snugly fit in the bore 12-4 of crossarm 12-1. At the same axial location and at 90° spacings on the cylindrical portion 20-1 of inlet ring 20 are, nominally, 0.125 inch by 0.125 inch radial protrusions 20-2. Inlet ring 20 has an inner, frustoconical portion 20-3 which is effectively folded back with respect to cylindrical portion 20-1 so as to make an angle of approximately 30° therewith.

Figure 4:
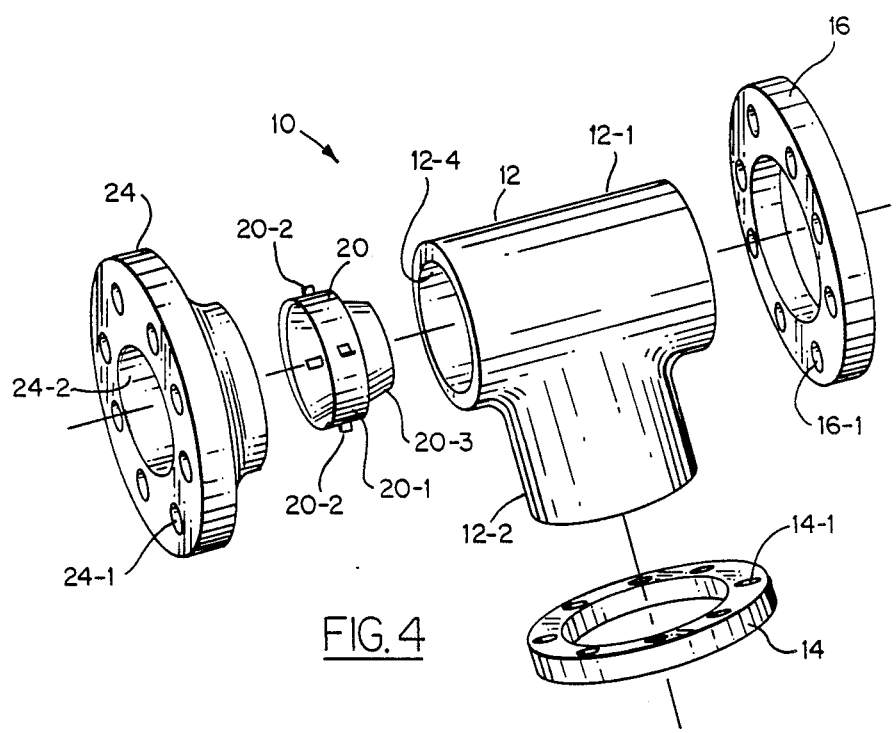
FIG. 4 is an exploded view of the structure of FIG. 1.

Inlet ring 20, during assembly of suction strainer 10, serves as a welding ring. Referring specifically to FIGS. 1 and 4, inlet ring 20 is inserted into the bore 12-4 to the extent permitted by protrusions 20-2 such that the smallest diameter portion of frustoconical portion 20-3 is within bore 12-4. Inlet flange 24, in the form of a weld neck flange, is placed over inlet ring 20 to the extent permitted by protrusions 20-2 such that inlet flange 24 and crossarm 12-1 act as sleeves with respect to inlet ring 20 and are separated by protrusions 20-2. This coaction properly locates and aligns flange 24, inlet ring 20 and tee 12 so that the spacing created by protrusions 20-2 provides the situs of full penetration weld 30. Flange 14 is provided with a plurality of circumferentially located holes 14-1 for receiving bolts (not illustrated) for bolting suction strainer assembly housing 10 to the inlet of a compressor (not illustrated). Flange 24 is provided with a plurality of circumferentially located holes 24-1 for receiving bolts (not illustrated) for bolting suction strainer assembly housing 10 to the fluid connection of the evaporator (not illustrated) of a refrigeration system. Flange 16 is provided with a plurality of circumferentially located threaded holes 16-1 for receiving bolts 40 for removably securing blind flange or plate 50 to flange 16 in a fluid tight manner.

With flanges 14, 16 and 24 welded to tee 12, as illustrated in FIG. 1 and described above, and with plate 50 removed, a strainer basket 60 can be inserted into bore 12-4 such that it seats on the outer surface of frustoconical portion 20-3 or, if present, can be removed and replaced. Strainer basket 60 includes end plate 61 and wire mesh portion 62. Wire mesh portion 62 is multi-layered, corrugated or pleated and is of a frustoconical configuration with a taper of, nominally, 5° as compared to the 30° taper of frustoconical portion 20-3 on which it seats. Strainer basket 60 includes an integral, solid end plate 61 which is located at the narrowest end of basket 60 and serves to center strainer basket 60 and by coacting with bore 12-4 directs the flow entering basket 60 through the mesh 62. A centrally located annular projection 63 is provided on the end plate 61 on the opposite side from mesh 62 and receives one end of spring 70 for which it provides a spring seat. Preferably, a gasket 80 is located between flange 16 and plate 50 to insure a fluid tight seal. Plate 50 has a centrally located recess 51 for receiving the other end of spring 70 and a plurality of circumferentially located holes 50-1 corresponding to holes 16-1. When bolts 40 are inserted through holes 50-1 and threaded into bores 16-1 of flange 16, strainer basket 60 is held biased onto frustoconical portion 20-3 by spring 70.

In operation, fluid is drawn into suction strainer assembly 100 va bore 24-2 in flange 24 and passes through the converging flow path defined by frustoconical portion 20-3 and into strainer basket 60. Because the converging of the flow path represents a loss and because the overlap of the mesh 62 on frustoconical portion 20-3 reduces its availability to flow, the overlap is preferably held to, nominally, a quarter of an inch. The flow entering strainer basket 60 must pass through mesh 62 since spring 70 keeps strainer basket 60 seated on frustoconical portion 20-3 and because end plate 61 is solid. Although there is a chance for leakage at the seat due to the corrugation or pleating of mesh 62, the location adjacent the inlet minimizes any such tendency. Due to the combination of the seating of strainer basket 60 on frustoconical portion 20-3, the centering effect of end plate 61, the taper of mesh 62 and the well rounded entrance 12-3 to upright branch 12-2, there is a relatively large annular space surrounding mesh 62 and providing a relatively unrestricted flow path between the entire inner surface of mesh 62 and upright branch 12-2. Since the large annular space surrounding mesh 62 minimizes the pressure differential across the mesh 62, the entire area is available for a flow path which minimizes flow losses.

Figure 5:
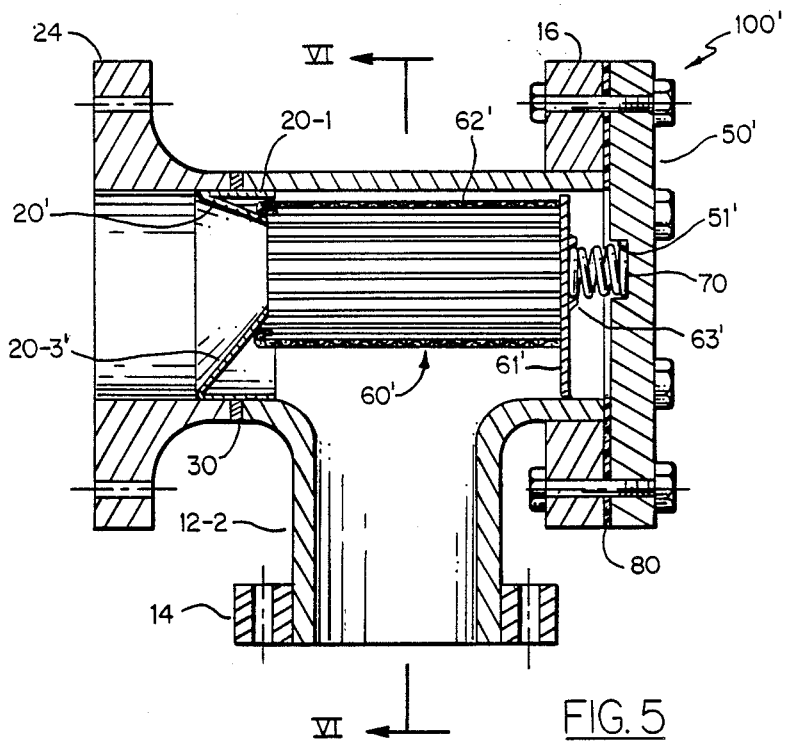
FIG. 5 is a sectional view of a modified suction strainer assembly.
Figure 6:
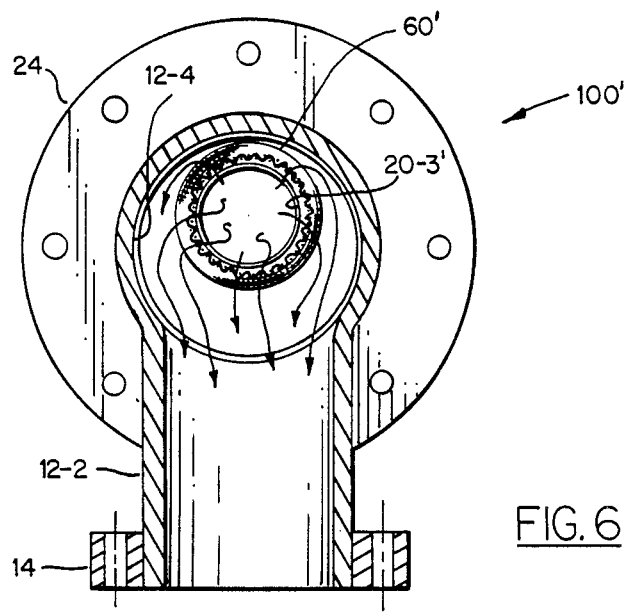
FIG. 6 is a sectional view taken along line VI-VI of FIG. 5.

In FIGS. 5 and 6 the numeral 100, generally designates a modified, assembled suction strainer assembly and the same numerals are used as are used in FIGS. 1-4 to label identical structure. Modified structure has been indicated by the use of a prime. The embodiment of FIGS. 5 and 6 differs from that of FIGS. 1-4 in locating the strainer basket 60' eccentrically in bore 12-4 so as to be spaced further from the portion of bore 12-4 nearest upright branch 12-2. As best seen in FIG. 6, basket 60' is spaced varying distances from the wall defining bore 12-4 with the largest spacing being five to seven times as large as the minimum spacing. The largest spacing is located facing the entrance to upright branch 12-2 and the narrowest spacing is 180° away. The minimum spacing is, preferably, 0.05 to 0.1 times the diameter of upright branch 12-2. As is clear from a comparison of FIGS. 3 and 6, basket 60' is smaller than basket 60 for the same size bore 12-4. Wire mesh portion 62' of basket 60' is cylindrical but is eccentrically located on end plate 61, and annular projection 63' is eccentrically located on end plate 61' so as to be essentially coaxial with mesh portion 62'. The frustoconical portion 20-3' of inlet ring 20' does not make a uniform angle with cylindrical portion 20-1' and since the height of the frustoconical portion is uniform on all sides, an eccentrically located seat is provided for mesh portion 62' of basket 60. Since annular projection 63' is eccentrically located, recess 51' in plate 50' must also be similarly eccentrically located so that spring 70 is not canted. Suction strainer 100' further reduces the pressure drop by increasing the spacing between the mesh and the outlet thereby increasing the area of the mesh with essentially the same pressure drop.

Although a preferred embodiment of the present invention has been illustrated and described, other changes will occur to those skilled in the art. It is therefore intended that the present invention is to be limited only by the scope of the appended claims.

What is claimed is:

1. A suction strainer assembly comprising:
   housing means including a tee having a crossarm with a bore therein and an upright branch with a bore therein intersecting said bore of said crossarm to define an intersection;
   said crossarm bore having a first end defining an inlet and a second end which is closed;
   said upright branch defines an outlet;
   a single strainer means;
   seat means including an inner member which extends into said crossarm bore near said first end and inside said strainer means and tapers inwardly into said crossarm bore to define a flow path whereby all fluid entering said inlet is directed through said flow path in said seat means;
   said strainer means including a single mesh portion having a generally circular cross section and coacting with said seat means and said crossarm bore to seat on said seat means within said crossarm bore and to position said mesh portion in spaced relationship with said bore of said crossarm so as to define an annular space therewith and in spaced relationship with said intersection whereby fluid entering said inlet serially passes through said flow path in said seat means directly into said strainer means, radially through said mesh portion over its entire circumference into said annular space and thence into said upright branch bore.

2. The suction strainer assembly of claim 1 wherein said mesh portion converges in a downstream direction so as to be further spaced from said crossarm bore at said intersection than at said inlet.

3. The suction strainer of claim 2 wherein said mesh portion converges at an angle of 5°.

4. The suction strainer assembly of claim 1 wherein said intersection has a rounding radius of at least 0.1 times the cross-sectional diameter of said upright branch.

5. The suction strainer assembly of claim 1 wherein said mesh portion has a surface are of 6 to 10 times the cross-sectional area of said upright branch.

6. The suction strainer assembly of claim 1 wherein said mesh portion is spaced from said intersection by a distance of at least 0.15 times the diameter of said upright branch.

7. The suction strainer assembly of claim 1 wherein said mesh portion is eccentrically located in said crossarm bore.

* * * * *